(12) United States Patent
Hakura et al.

(10) Patent No.: US 9,448,804 B2
(45) Date of Patent: Sep. 20, 2016

(54) TECHNIQUES FOR MANAGING GRAPHICS PROCESSING RESOURCES IN A TILE-BASED ARCHITECTURE

(71) Applicant: NVIDIA CORPORATION, Santa Clara, CA (US)

(72) Inventors: Ziyad S. Hakura, Gilroy, CA (US); Cynthia Ann Edgeworth Allison, Madison, AL (US); Dale L. Kirkland, Madison, AL (US)

(73) Assignee: NVIDIA Corporation, Santa Clara, CA (US)

( * ) Notice: Subject to any disclaimer, the term of this patent is extended or adjusted under 35 U.S.C. 154(b) by 107 days.

(21) Appl. No.: 14/045,367

(22) Filed: Oct. 3, 2013

(65) Prior Publication Data

US 2014/0118374 A1 May 1, 2014

Related U.S. Application Data

(60) Provisional application No. 61/719,271, filed on Oct. 26, 2012.

(51) Int. Cl.
*G09G 5/36* (2006.01)
*G06F 9/38* (2006.01)
(Continued)

(52) U.S. Cl.
CPC . *G06F 9/38* (2013.01); *G06F 9/44* (2013.01); *G06F 12/0808* (2013.01); *G06F 12/0875* (2013.01); *G06T 1/20* (2013.01); *G06T 1/60* (2013.01); *G06T 15/005* (2013.01); *G06T 15/405* (2013.01); *G06T 15/503* (2013.01); *G06T 15/80* (2013.01); *G09G 5/003* (2013.01);
(Continued)

(58) Field of Classification Search
CPC ........ G09G 5/393; G09G 5/39; G09G 5/395; G09G 5/363; G06T 1/60
USPC .......................................................... 345/545
See application file for complete search history.

(56) References Cited

U.S. PATENT DOCUMENTS 6,323,860 B1 11/2001 Zhu et al.
6,535,209 B1 3/2003 Abdalla et al.
(Continued)

OTHER PUBLICATIONS

"Hardware Algorithms for Tile-Based Real-Time Rendering" (by Dan Crisu, published in May 1, 2012).*
(Continued)

*Primary Examiner* — Ke Xiao
*Assistant Examiner* — Gordon Liu
(74) *Attorney, Agent, or Firm* — Artegis Law Group, LLP

(57) ABSTRACT

One embodiment of the present invention sets forth a technique for managing buffer entries in a tile-based architecture. The technique includes receiving a first plurality of graphics primitives and a first buffer address at which attributes associated with the first plurality of graphics primitives are stored. The technique further includes, for each tile included in a plurality of tiles, transmitting the first plurality of graphics primitives and the first buffer address to a screen space pipeline and receiving an acknowledgement from the screen space pipeline indicating that processing the first plurality of graphics primitives has completed. The technique further includes determining that processing the first plurality of graphics primitives has completed for a last tile included in the plurality of tiles and that the acknowledgement has been received for each tile included in the plurality of tiles, and, in response, releasing a buffer entry associated with the first buffer address.

20 Claims, 11 Drawing Sheets

(51) Int. Cl.

| | |
|---|---|
| *G06T 15/00* | (2011.01) |
| *G06T 15/40* | (2011.01) |
| *G06T 1/20* | (2006.01) |
| *G06T 1/60* | (2006.01) |
| *G09G 5/395* | (2006.01) |
| *G09G 5/00* | (2006.01) |
| *G06T 15/50* | (2011.01) |
| *G06F 12/08* | (2016.01) |
| *G06F 9/44* | (2006.01) |
| *G06T 15/80* | (2011.01) |

(52) U.S. Cl.
CPC ......... *G09G 5/395* (2013.01); *G06F 2212/302* (2013.01); *Y02B 60/1225* (2013.01)

(56) References Cited

U.S. PATENT DOCUMENTS

| | | | |
|---|---|---|---|
| 6,697,063 B1 | 2/2004 | Zhu et al. | |
| 6,717,576 B1* | 4/2004 | Duluk et al. | 345/419 |
| 7,102,646 B1* | 9/2006 | Rubinstein et al. | 345/570 |
| 7,170,515 B1 | 1/2007 | Zhu et al. | |
| 8,605,102 B1 | 12/2013 | Purcell et al. | |
| 2008/0074430 A1 | 3/2008 | Jiao et al. | |
| 2009/0058848 A1 | 3/2009 | Howson | |
| 2010/0169608 A1 | 7/2010 | Kuo et al. | |

OTHER PUBLICATIONS

Non-Final Office Action having U.S. Appl. No. 14/045,372, dated May 8, 2015.

Non-Final Office Action for U.S. Appl. No. 14/045,361 dated Feb. 26, 2016.

Non-Final Office Action for U.S. Appl. No. 14/046,249 dated May 10, 2016.

* cited by examiner

TECHNIQUES FOR MANAGING GRAPHICS PROCESSING RESOURCES IN A TILE-BASED ARCHITECTURE

CROSS-REFERENCE TO RELATED APPLICATIONS

This application claims benefit of U.S. provisional patent application Ser. No. 61/719,271, filed Oct. 26, 2012, and titled "An Approach for Tiled Caching." The subject matter of this related application is hereby incorporated herein by reference.

BACKGROUND OF THE INVENTION

1. Field of the Invention

Embodiments of the present invention relate generally to graphics processing and, more specifically, to techniques for managing graphics processing resources in a tile-based architecture.

2. Description of the Related Art

Conventional graphics systems receive and process graphics primitives in an order specified by the applications programming interface (API). For example, various graphics APIs require that the primitive order be maintained; that is, the primitives must be rendered in the order presented by the application program. This requirement ensures that intersecting primitives are rendered deterministically to avoid the introduction of visual artifacts. Additionally, the results of rendering a later primitive may depend on changes to the state of the frame buffer generated by rendering an earlier primitive.

Processing graphics primitives in the order in which they are received from the application program further enables the graphics processor to determine when resources associated with a particular graphics primitive are no longer needed and, thus, may be released. For example, once a particular graphics primitive reaches the end of the graphics pipeline, the graphics processor may determine that the resources associated with the graphics primitive, such as buffered vertex attributes, are no longer needed and may be released. This process ensures that resources are efficiently allocated and de-allocated by the graphics processor.

More recently, various graphics systems have begun to implement a tiling architecture that divides the screen-space into tiles and processes data associated with each tile in a particular order. That is, data associated with a first tile is processed first, data associated with a second tile is processed second, and so on. In such graphics systems, graphics primitives are processed according to which tiles they intersect and typically are not processed in the order specified by the API. Additionally, each graphics primitive that intersects multiple screen-space tiles is sent through the screen-space pipeline multiple times, once for each tile intersected by the graphics primitive. As a result, when implementing a tiling architecture, the graphics processor cannot accurately determine whether resources associated with a particular graphics primitive can be released based only on tracking when the graphics primitive has reached the end of the graphics pipeline, since the resources may be needed in order to process subsequent tiles. Moreover, prematurely releasing resources needed to process subsequent tiles may introduce visual artifacts and/or application errors into the rendering process.

Accordingly, what are needed in the art are more effective techniques for managing the use and release of resources in a tile-based graphics architecture.

SUMMARY OF THE INVENTION

One embodiment of the present invention sets forth a method for managing buffer entries in a tile-based architecture. The method includes receiving a first plurality of graphics primitives and a first buffer address at which attributes associated with the first plurality of graphics primitives are stored. The method further includes, for each tile included in a plurality of tiles, determining that at least one graphics primitive included in the first plurality of graphics primitives intersects the tile, transmitting the first plurality of graphics primitives and the first buffer address to a screen space pipeline for processing, and receiving an acknowledgement from the screen space pipeline indicating that processing the first plurality of graphics primitives has completed. The method further includes determining that a first condition exists that indicates that processing the first plurality of graphics primitives has completed for a last tile included in the plurality of tiles and determining that a second condition exists that indicates that the acknowledgement has been received for each tile included in the plurality of tiles. Finally, the method includes, in response to determining that both the first condition and the second condition exists, releasing a buffer entry associated with the first buffer address.

One advantage of the disclosed technique is that the use of a resource by the graphics processing pipeline may be tracked to determine when the resource is no longer needed. Once a resource is no longer needed, the resource may be released, increasing the availability of resources and, as a result, increasing processing efficiency in the graphics processing pipeline. In addition, tracking resource usage and determining when a particular resource is no longer needed before releasing the resource may reduce the incidence of errors in the graphics processing pipeline caused by premature release of resources.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
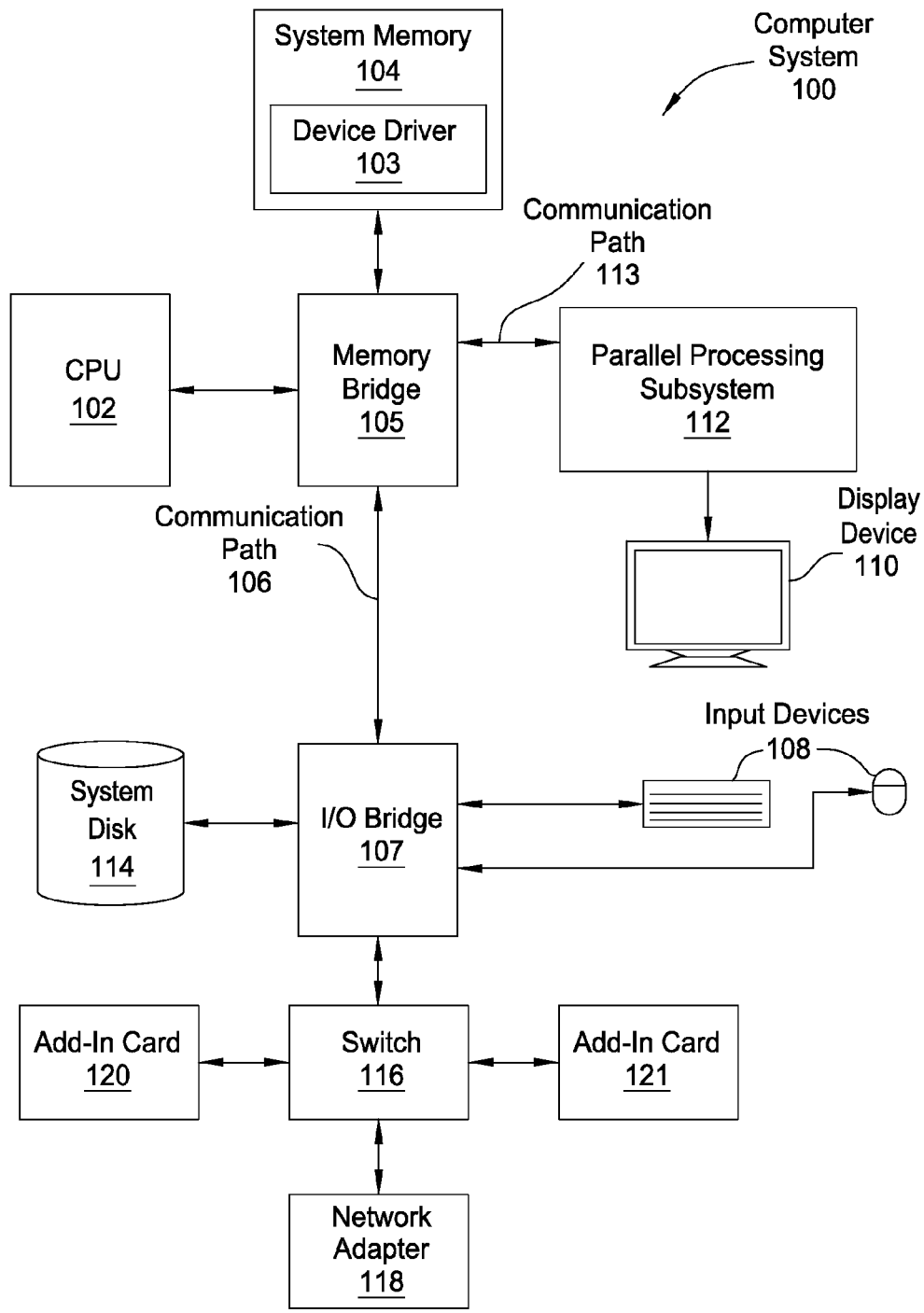
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
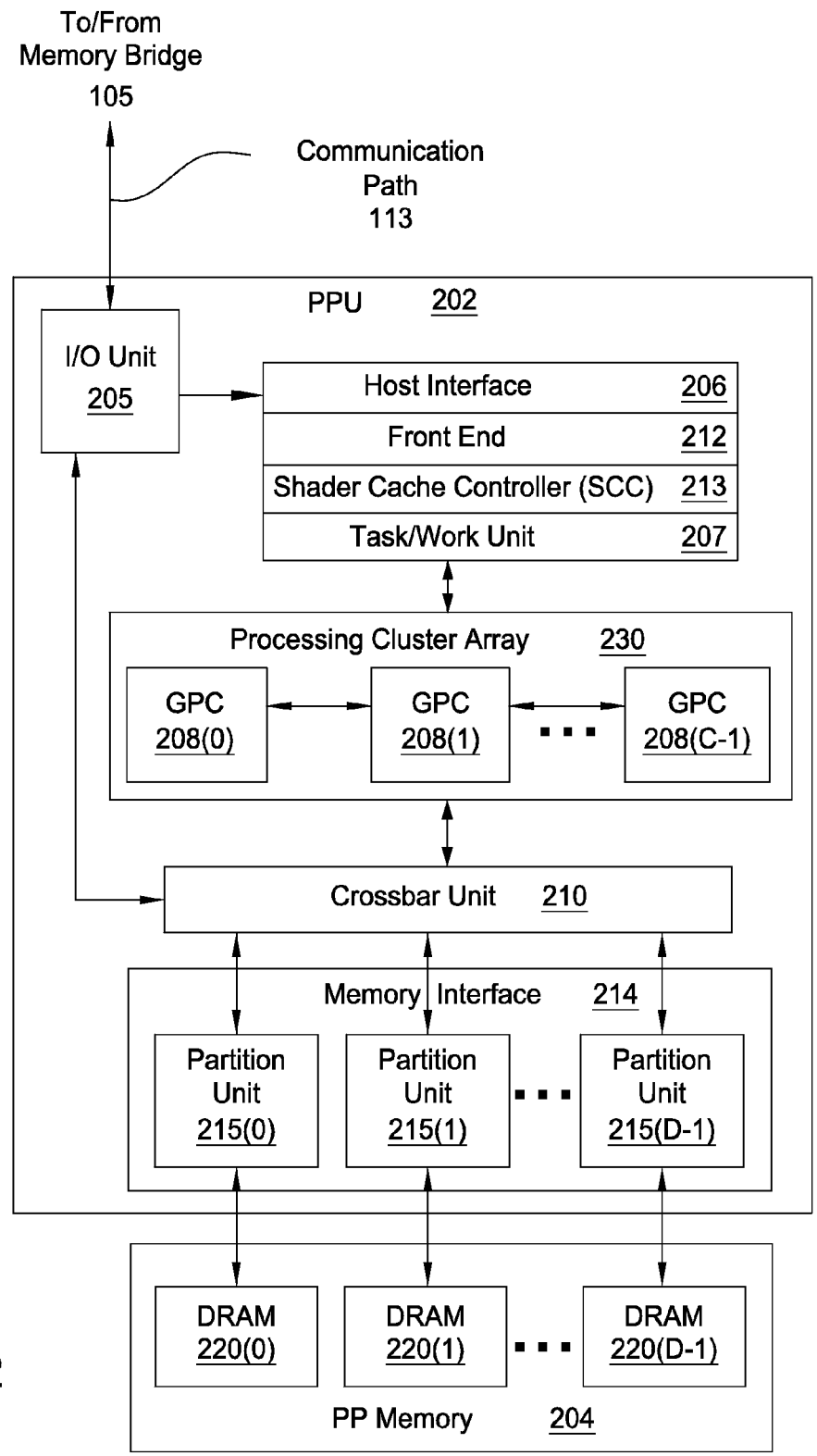
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

A shader cache controller (SCC) 213 may be coupled to the front end unit 212. The SCC 213 may be configured to track buffer entries using one or more buffer tables. For example, the SCC 213 may include a buffer table that stores addresses of the PP memory 204 at which data (e.g., textures, render targets, etc.) can be found. The SCC 213 may further manage entries in the buffer table and release entries that are no longer needed.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
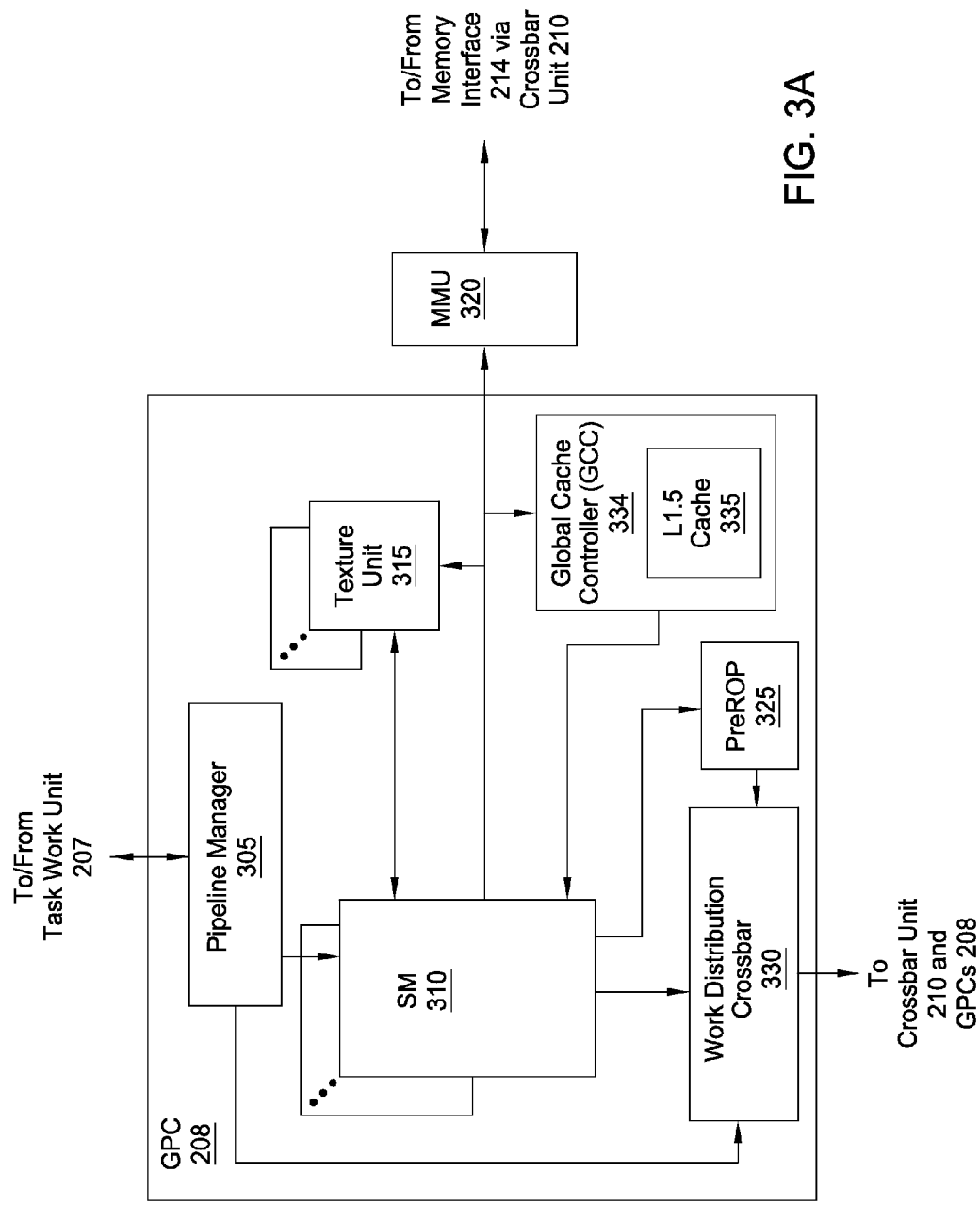
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335. The L1.5 cache 335 may be managed by a global cache controller (GCC) 334. Additionally, the GCC 334 may include one or more buffer tables that store references (e.g., buffer addresses) associated with data stored in the PP memory 204. In one embodiment, one or more buffer tables stored in the SCC 213 are replicated in the GCC 334 associated with each GPC 208.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
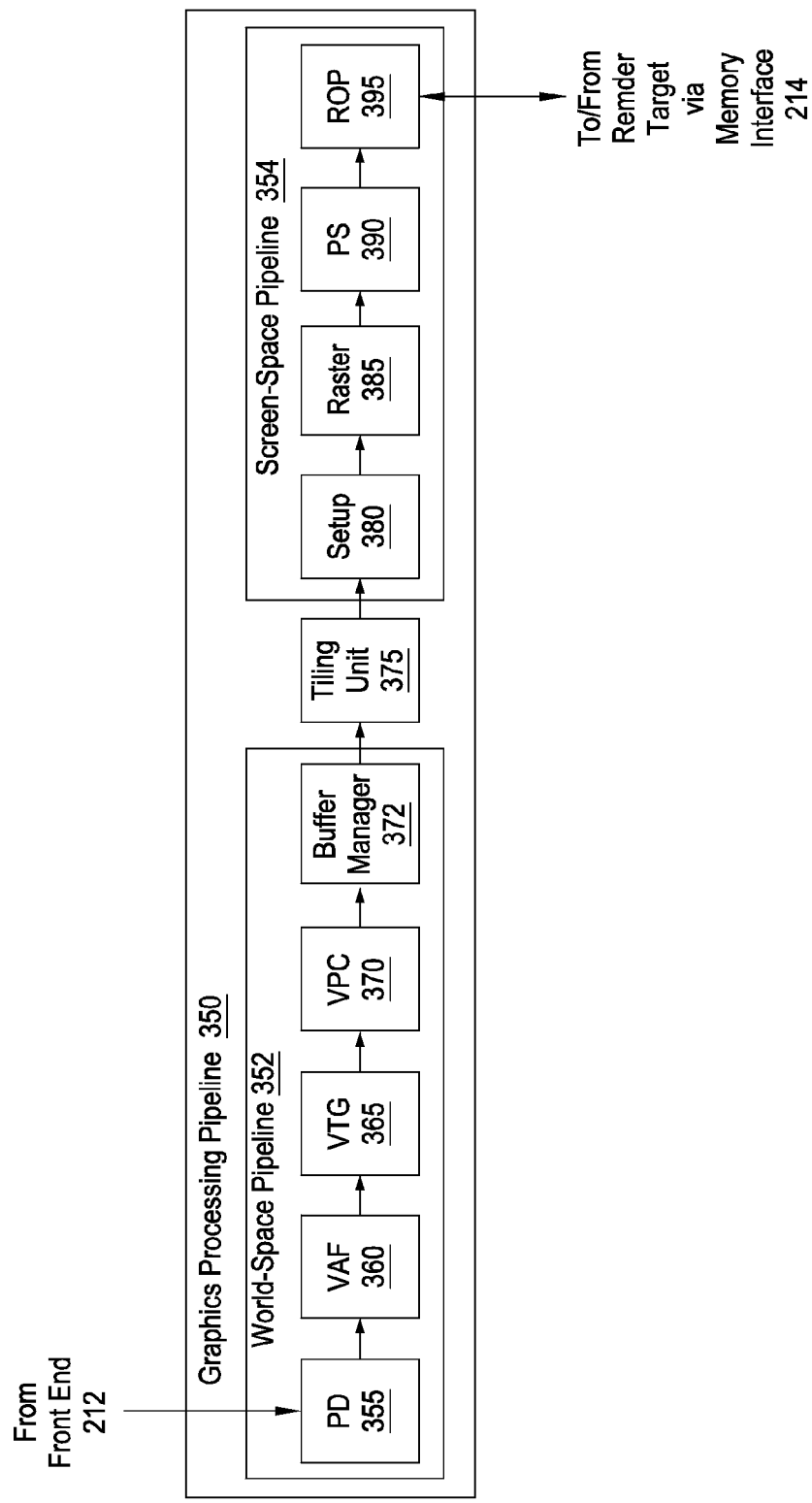
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a buffer manager 372, a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives, as well as color values, surface normal vectors, and transparency values at each vertex for the graphics primitives. for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world-space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable.

The buffer manager 372 receives vertex attributes associated with the graphics primitives and stores the vertex attributes in one or more buffer entries included in a buffer (e.g., a circular buffer). The buffer manager 372 then transmits buffer addresses at which the vertex attributes can be found to the screen-space pipeline 354. The buffer manager 372 further tracks the buffer entries and releases the buffer entries when they are no longer needed by the graphics processing pipeline 350.

The VPC 370 transmits the processed graphics primitives to the tiling unit 375. The tiling unit 375 is a graphics primitive sorting engine that resides between a world-space pipeline 352 and a screen-space pipeline 354, as further described herein. Graphics primitives are processed in the world-space pipeline 352 and then transmitted to the tiling unit 375. The screen-space is divided into cache tiles, where each cache tile is associated with a portion of the screen-space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world-space pipeline 352, but are then transmitted multiple times to the screen-space pipeline 354.

Such a technique improves cache memory locality during processing in the screen-space pipeline 354, where multiple memory operations associated with a first cache tile access a region of the L2 caches, or any other technically feasible cache memory, that may stay resident during screen-space processing of the first cache tile. Once the graphics primitives associated with the first cache tile are processed by the screen-space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen-space processing of the second cache tile. Accordingly, the overall memory traffic to the L2 caches and to the render targets may be reduced. In some embodiments, the world-space computation is performed once for a given graphics primitive irrespective of the number of cache tiles in screen-space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the pixel shading unit 390 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 370, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world-space pipeline 352 and a screen-space pipeline 354. The world-space pipeline 352 processes graphics objects in 3D space, where the position of each graphics object is known relative to other graphics objects and relative to a 3D coordinate system. The screen-space pipeline 354 processes graphics objects that have been projected from the 3D coordinate system onto a 2D planar surface representing the surface of the display device 110. For example, the world-space pipeline 352 could include pipeline stages in the graphics processing pipeline 350 from the PD 355 through the VPC 370. The screen-space pipeline 354 could include pipeline stages in the graphics processing pipeline 350 from the setup unit 380 through the ROP 395. The tiling unit 375 would follow the last stage of the world-space pipeline 352, namely, the VPC 370. The tiling unit 375 would precede the first stage of the screen-space pipeline 354, namely, the setup unit 380.

In some embodiments, the world-space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Tiled Caching

Figure 4:
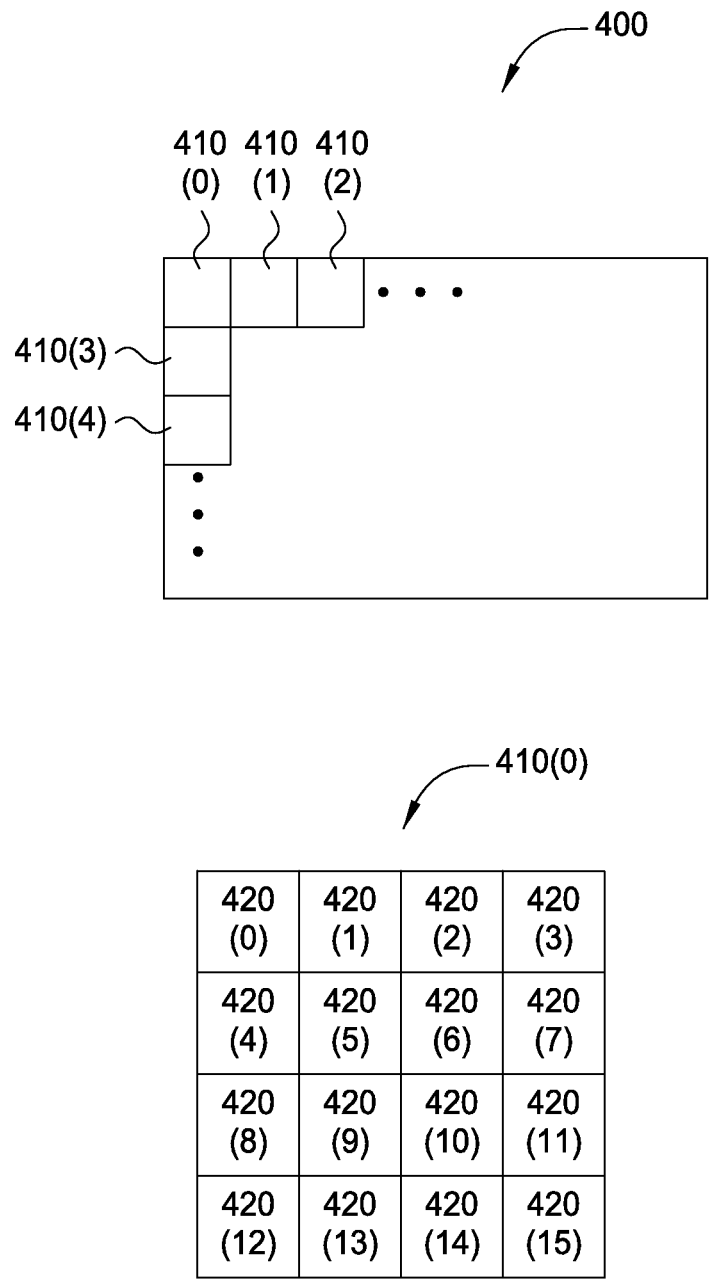
FIG. 4 is a conceptual diagram of a cache tile that the graphics processing pipeline of FIG. 3B may be configured to generate and process, according to one embodiment of the present invention.

FIG. 4 is a conceptual diagram of a cache tile 410(0) that the graphics processing pipeline 350 of FIG. 3B may be configured to generate and process, according to one embodiment of the present invention. As shown, the cache tile 410(0) represents a portion of a screen-space 400 and is divided into multiple raster tiles 420.

The screen-space 400 represents one or more memory buffers configured to store rendered image data and other data transmitted by functional units within the graphics processing pipeline 350. In some embodiments, the one or more memory buffers may be configured as one or more render targets. The screen-space represents a memory buffer configured to store the image rendered by the graphics processing pipeline. The screen-space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen-space 400. In operation, once rendering completes, the pixels in the one or more render targets may be transmitted to a display device in order to display the rendered image.

By way of example, a set of render targets for the screen-space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen-space 400. For clarity, only five cache tiles 410(0)-410(4) are shown in FIG. 4. In some embodiments, cache tiles may have an arbitrary size in X and Y screen-space. For example, if a cache tile were to reside in a cache memory that also is used to store other data, then the cache tile could be sized to consume only a specific portion of the cache memory. The size of a cache tile may be based on a number of factors, including the quantity and configuration of the render targets associated with the screen-space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

Managing Graphics Processing Resources in a Tile-Based Architecture

During tiled rendering, the tiling unit 375 transmits graphics primitives associated with each cache tile 410 to the setup unit 380 for processing in the screen-space pipeline 354. When transmitting graphics primitives to the screen-space pipeline 354, the tiling unit 375 also transmits state associated with the graphics primitives. One type of state transmitted to the screen-space pipeline 354 is a release packet. A release packet is inserted by the API to release a graphics processing resource at a particular point in an instruction stream. For example, the API may insert a release packet at a particular point in an instruction stream to indicate that a texture or render target stored in a buffer is no longer referenced after that point in the instruction stream and, thus, may be released.

However, when performing tiled rendering, state is not processed in the order specified by the API. Instead, the order in which state is processed is determined by which cache tile(s) 410 the graphics primitives associated with the state intersect. As a result, a release packet configured to release a particular graphics processing resource may be transmitted to the screen-space pipeline 354 before all of the processing associated with the graphics processing resource is complete, causing the corresponding graphics processing resource to be released prematurely. Additionally, if a graphics primitive with which the graphics processing resource is associated intersects multiple cache tiles 410, the graphics processing resource may be used in the screen-space pipeline 354 multiple times, once for each cache tile 410 intersected by the graphics primitive. Consequently, transmitting a release packet to the screen-space pipeline 354 prior to processing the last cache tile 410 associated with the graphics processing resource may introduce visual artifacts and/or application errors into the rendering process.

Accordingly, in various embodiments, the tiling unit 375 is configured to transmit certain types of state, such as release packets, to the screen-space pipeline 354 on only the last cache tile 410 processed during a particular replay. Such techniques are discussed below in further detail in conjunction with FIGS. 5-8B.

Figure 5A:
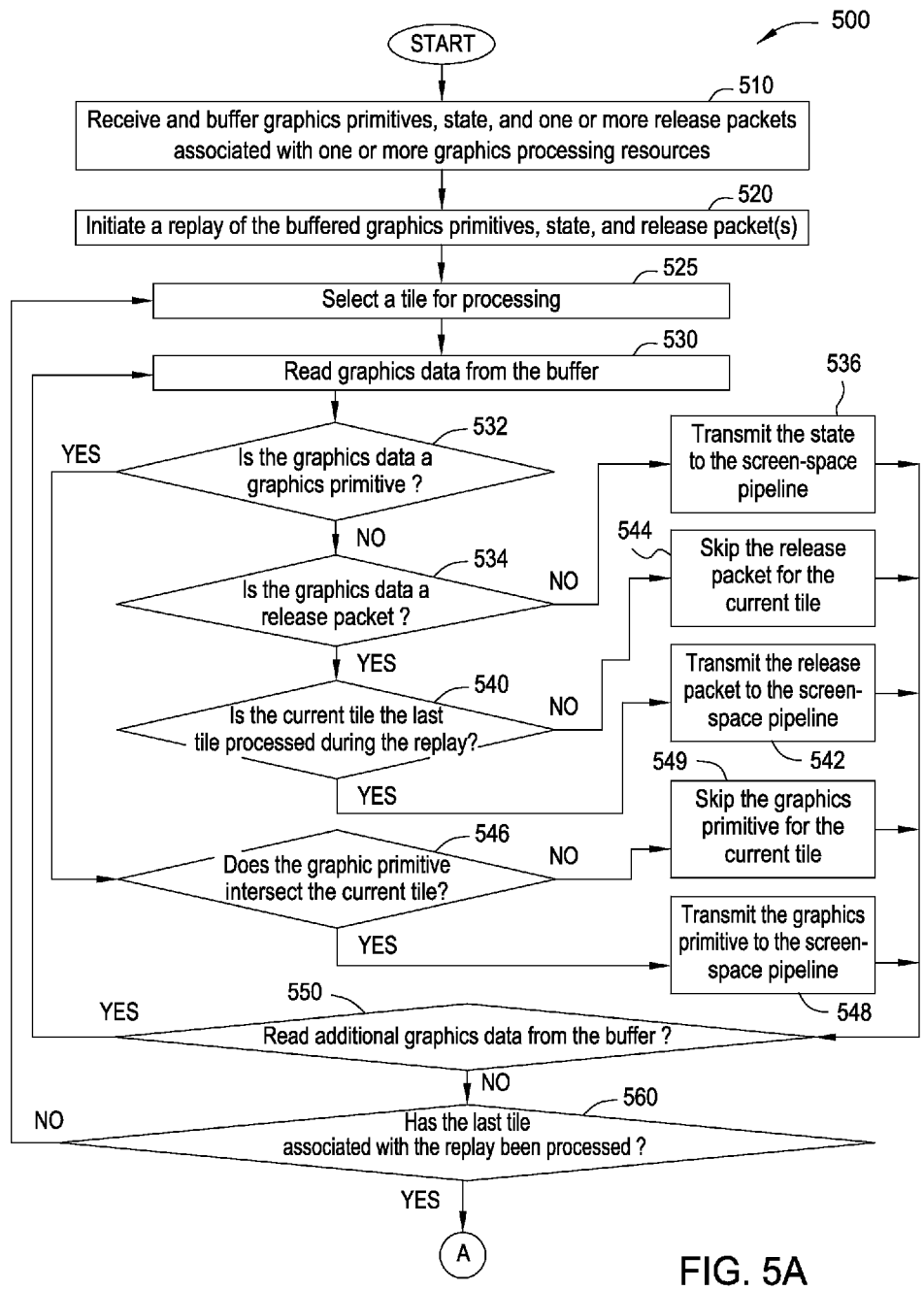
FIGS. 5A and 5B are a flow diagram of method steps for managing graphics processing resources in a tile-based architecture, according to one embodiment of the present invention.
Figure 5B:
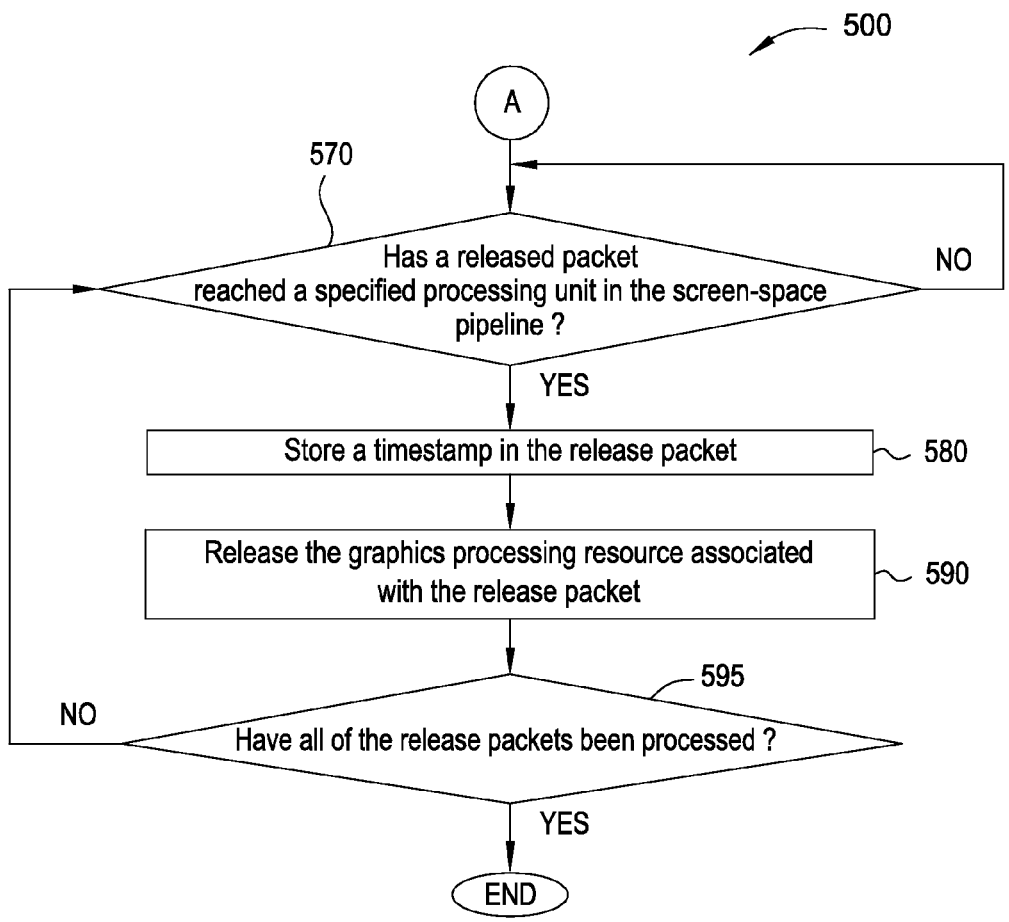

FIGS. 5A and 5B are a flow diagram of method steps for managing graphics processing resources in a tile-based architecture, according to one embodiment of the present invention. Although the method steps are described in conjunction with the systems of FIGS. 1-4, persons skilled in the art will understand that any system configured to perform the method steps, in any order, falls within the scope of the present invention.

As shown in FIG. 5A, a method 500 begins at step 510, where the tiling unit 375 buffers graphics primitives and state received from the world-space pipeline 352. The state received from the world-space pipeline 352 includes one or more release packets, each of which may be associated with a graphics processing resource. The graphics processing resource may include, without limitation, a texture or render target stored in the frame buffer, a binding table entry, a buffer entry at which attributes associated with one or more graphics primitives are stored, and the like. In one embodiment, the one or more release packets include a semaphore release that is associated with a texture or render target stored in the frame buffer with which rendering is performed.

At step 520, once a sufficient number of graphics primitives and/or state (e.g., release packets) have been buffered, the tiling unit 375 initiates a replay of the buffered graphics primitives and state. At step 525, the tiling unit 375 selects a cache tile 410 for processing. At step 530, the tiling unit 375 reads graphics data from the buffer. Next, at step 532, the tiling unit 375 determines whether the graphics data is a graphics primitive. If the graphics data is a graphics primitive, then, at step 546, the tiling unit 375 further determines whether the graphics primitive intersects the cache tile 410 that is currently being processed by the tiling unit 375. If the graphics primitive intersects the current cache tile 410, then, at step 548, the tiling unit 375 transmits the graphics primitive to the screen-space pipeline 354 for processing. The method 500 then proceeds to step 550. If the graphics primitive does not intersect the current cache tile 410, then, at step 549, the tiling unit 375 skips over the graphics primitive. The method 500 then proceeds to step 550.

If, at step 532, the tiling unit 375 determines that the graphics data is not a graphics primitive, then, at step 534, the tiling unit 375 determines whether the graphics data is a release packet. If the graphics data is not a release packet, then the tiling unit 375 determines that the graphics data is state and, at step 536, transmits the state to the screen-space pipeline 354. If the graphics data is a release packet, then the method 500 proceeds to step 540.

State received from the world-space pipeline 352 may include one or more values that indicate whether the state should be replayed for all cache tiles 410 intersected by a corresponding graphics primitive or replayed only when processing certain cache tiles 410. For example, a value may be stored in the release packet described above to indicate that the release packet is to be replayed on the last cache tile 410 only. At step 530, the tiling unit 375 may then read the value associated with the release packet and, at step 534, determine that the release packet is to be transmitted to the screen-space pipeline 354 on only the last cache tile 410 processed during the replay.

After determining that the release packet is to be transmitted to the screen-space pipeline 354 on only the last cache tile 410 processed during the replay, at step 540, the tiling unit 375 determines whether the current cache tile 410 being processed is the last cache tile 410 to be processed during the replay. If the current cache tile 410 is not the last cache tile 410 to be processed during the replay, then the tiling unit 375 determines that the release packet should not be transmitted to screen-space pipeline 354. Thus, at step 544, the tiling unit 375 skips over the release packet and the method 500 then proceeds to step 550.

At step 550, the tiling unit 375 determines whether additional graphics data is to be read from the buffer. If additional graphics data is to be read from the buffer, then the tiling unit 375 returns to step 530. If no additional graphics data is to be read from the buffer, then, at step 560, the tiling unit 375 determines whether the last cache tile 410 to be processed during the replay has been processed. If the last cache tile 410 has not been processed, then the method 500 returns to step 525, where an additional cache tile 410 is selected. If the last cache tile 410 has been processed, then the method 500 proceeds to step 570, shown in FIG. 5B.

Next, at step 570, the front end unit 212 and/or tiling unit 375 determine whether the release packet(s) have reached a specified processing unit within the graphics processing pipeline 350. Once a release packet reaches the specified processing unit, at step 580, a timestamp optionally may be stored in the release packet and, at step 590, the graphics processing resource associated with the release packet is released. The specified processing unit may be indicated by a value stored in the release packet. For example, a processing unit that receives the release packet may read a value stored in the release packet to determine whether the processing unit should transmit the release packet and/or an acknowledgement to the front end unit 212 and/or tiling unit 375.

Finally, at step 595, the front end unit 212 and/or the tiling unit 375 determines whether all of the release packets have been processed. For example, the front end unit 212 and/or the tiling unit 375 may determine whether all of the release packets have reached the specified processing unit(s) and/or whether all of the graphics processing resource(s) associated with the release packet(s) have been released. If not all of the release packets have been processed, then the method 500 returns to step 570. If all of the release packets have been processed, then the method 500 ends.

Although steps 570, 580 and 590 are shown as being performed after step 560, steps 570, 580 and 590 may be performed at any point after a release packet is transmitted to the screen-space pipeline 354 at step 542. For example, the front end unit 212 and/or tiling unit 375 may release one or more graphics processing resources associated with one or more release packets before the tiling unit 375 is finished reading graphics data from the buffer (e.g., step 530) for a particular cache tile 410.

In various embodiments, once the release packet reaches the specified processing unit, an acknowledgement is transmitted from the specified processing unit back to the front end unit 212 and/or the tiling unit 375. The front end unit 212 and/or the tiling unit 375 then receives the acknowledgement, and the front end unit 212 releases the graphics processing resource associated with the release packet.

In one embodiment, the specified processing unit is the ROP 395. Releasing the graphics processing resource once the release packet reaches the ROP 395 ensures that processing of the graphics primitives associated with graphics processing resource is complete before the graphics processing resource is released. For example, once the release packet reaches the ROP 395, it is likely that all work transmitted to the screen-space pipeline 354 prior to the release packet has completed, and final color values have been written to memory for each graphics primitive associated with the graphics processing resource. Thus, the graphics processing resource can be released without interfering with rendering of the corresponding graphics primitives.

In other embodiments, the front end unit 212 and/or tiling unit 375 may release the graphics processing resource once the release packet reaches a specified processing unit other than the ROP 395, such as the rasterizer 385, the pixel shading unit (PS) 390, or a different processing unit upstream or downstream of the ROP 395.

In yet another embodiment, once the release packet reaches the specified processing unit, the specified processing unit may transmit the release packet—instead of a separate acknowledgement—back to the front end unit 212 and/or tiling unit 375. Additionally, the specified processing unit may insert a timestamp into the release packet or acknowledgement indicating the time at which the specified processing unit received the release packet. The front end unit 212 and/or tiling unit 375 may then read the timestamp upon receiving the release packet or acknowledgement to determine a duration of time associated with a particular rendering process. For example, the timestamp may be used to determine the duration of time required to complete a rendering process based on when the release packet reached the specified processing unit.

The method 500 of FIG. 5 is generally applicable to managing and releasing different types of graphics processing resources. However, additional considerations may be taken into account when managing state associated with certain types of graphics processing resources. For example, some types of graphics processing resources may remain in use for an extended period of time after being transmitted to the screen-space pipeline 354 and/or may be used during multiple replays of buffered graphics primitives and state. Accordingly, additional techniques for releasing graphics processing resources such as buffer entries (e.g., used to store attributes associated with graphics primitives) and binding table entries (e.g., used to bind shader banks to a constant buffer) are described below in conjunction with FIG. 6 and FIGS. 8A-8B, respectively.

Figure 6:
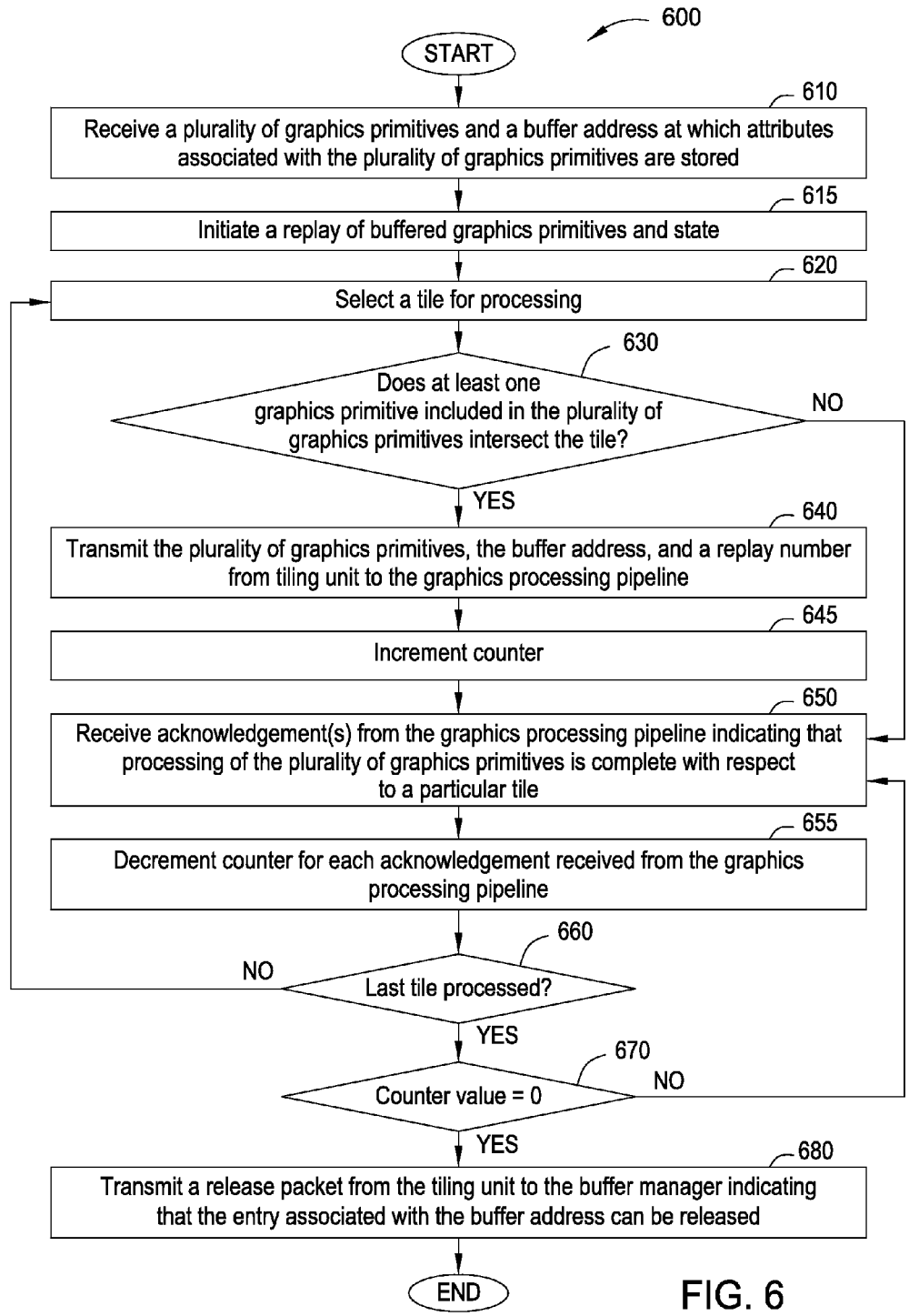
FIG. 6 is a flow diagram of method steps for tracking the usage of a buffer entry and releasing the buffer entry during a replay of buffered graphics primitives, according to one embodiment of the present invention.

FIG. 6 is a flow diagram of method steps for tracking the usage of a buffer entry and releasing the buffer entry during a replay of buffered graphics primitives, according to one embodiment of the present invention. Although the method steps are described in conjunction with the systems of FIGS. 1-4, persons skilled in the art will understand that any system configured to perform the method steps, in any order, falls within the scope of the present invention.

As shown, a method 600 begins at step 610, where the tiling unit 375 receives graphics primitives and a buffer address of a buffer entry—in which attributes associated with the graphics primitives are stored—from the world-space pipeline 352. The attributes stored in the buffer entry may include, without limitation, vertex attributes such as color, normal, and texture coordinates. Although the method 600 is described with respect to a single buffer address of a single buffer entry, the techniques described herein may also be used to track and release multiple buffer entries during the same time period or similar time periods.

At step 615, once a sufficient number of graphics primitives have been buffered, the tiling unit 375 initiates a replay of the buffered graphics primitives and, at step 620, selects a cache tile 410 for processing. At step 630, the tiling unit 375 determines whether at least one graphics primitive included in the plurality of graphics primitives intersects the cache tile 410. If no graphics primitives included in the plurality of graphics primitives intersect the cache tile 410, then the method 600 proceeds to step 650, where the tiling unit 375 may receive one or more acknowledgements from the screen-space pipeline 354, as described below in further detail.

If at least one graphics primitive intersects the cache tile 410, then, at step 640, the tiling unit 375 transmits the plurality of graphics primitives, a replay number, and the buffer address to the screen-space pipeline 354 and, at step 645, increments a counter. The replay number may specify the replay for which the buffer address was transmitted to the screen-space pipeline 354. A separate counter may be used for each replay processed by the tiling unit 375. For example, when a buffer address is transmitted to the screen-space pipeline 354 for a first replay, a first counter may be incremented, indicating that a particular number of acknowledgements are expected for the first replay. Similarly, when the buffer address is transmitted to the screen-space pipeline 354 for a second replay, a second counter may be incremented, indicating that a particular number of acknowledgements are expected for the second replay. Thus, the number of times a particular buffer address is transmitted to the screen-space pipeline 354 may be tracked per replay. Further, when multiple buffer entries are transmitted to the graphics processing pipeline 350 at step 640, a separate counter may be assigned to track each buffer entry.

Next, at step 650, the tiling unit 375 may receive one or more acknowledgements from the screen-space pipeline 354 indicating that use of the buffer entry is complete with respect to a particular cache tile 410. The acknowledgements received from the screen-space pipeline 354 may include the replay number for which the graphics primitives and the buffer address were transmitted. At step 655, the tiling unit 375 decrements the counter associated with the replay number for each acknowledgement received from the screen-space pipeline 354.

At step 660, the tiling unit 375 determines whether the last cache tile 410 associated with the current replay has been processed. If the last cache tile 410 associated with the current replay has not yet been processed, then the method 600 returns to step 620, where an additional cache tile 410 is selected for processing. If the last cache tile 410 associated with the current replay has been processed, then, at step 670, the tiling unit 375 determines whether the counter value associated with the replay number is equal to an expected value, such as zero. If the counter value is equal to zero, then the number of acknowledgements received by the tiling unit 375 is equal to the number of times the buffer address was transmitted to the screen-space pipeline 354. The method 600 then proceeds to step 680, where a release packet is transmitted from tiling unit 375 to the buffer manager 372. In one embodiment, the tiling unit 375 may store a table that tracks which buffer manager 372 is associated with each buffer address transmitted to the screen-space pipeline 354. Once the buffer manager 372 receives the release packet, the buffer entry is released.

The release packet transmitted to the buffer manager 372 by the tiling unit 375 may specify one or more buffer addresses associated with one or more buffer entries that are to be released by the buffer manager. For example, the release packet may store a range of buffer addresses at which attributes associated with a batch of graphics primitives are stored. Then, upon receiving the release packet, the buffer manager 372 may release the range of buffer addresses. In one embodiment, the buffer manager 372 may store a valid bit for each buffer address or range of buffer addresses and, in response to receiving a release packet from the tiling unit 375, modify the valid bit to release a buffer address or range of buffer addresses.

Figure 7:
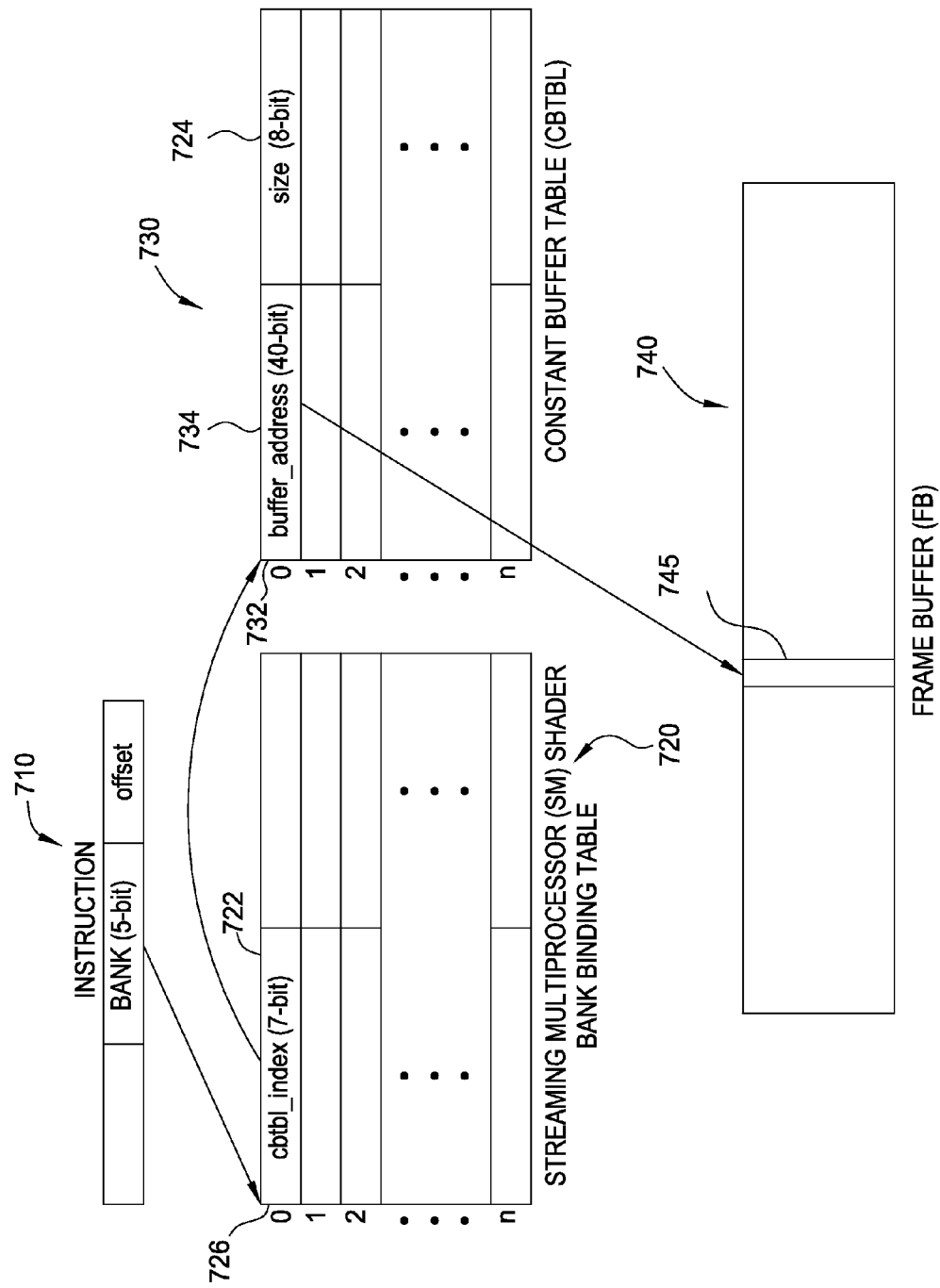
FIG. 7 is a conceptual diagram of a shader bank binding table and a constant buffer table (CBTBL) included in the parallel processing unit of FIG. 2, according to one embodiment of the present invention.

FIG. 7 is a conceptual diagram of a shader bank binding table 720 and a constant buffer table (CBTBL) 730 included in the parallel processing unit 202 of FIG. 2, according to one embodiment of the present invention. Each entry in the shader bank binding table 720 may include a buffer table index 722 (e.g., CBTBL index). Each buffer table index 722 points to a buffer table entry 732 in the CBTBL 730. Each buffer table entry 732 in the CBTBL 730 may include a buffer address 734 and a size 724. The buffer address 734 is an address of a constant buffer 745 at which a streaming multiprocessor (SM) 310 may access data and/or store data when executing a shader program. For example, a shader program instruction 710 may specify a shader bank 726 included in the shader bank binding table 720. The shader program may then use the buffer table index 722 stored in the bank and the buffer address 734 associated with the buffer table index 722 to perform rendering with data stored in the constant buffer 745 and/or to store data generated during rendering in the constant buffer 745. The constant buffer 745 may be stored in a portion of memory such as a frame buffer 740.

In one embodiment, the shader bank binding table 720 is replicated for each warp included in a SM 310 (e.g., 32 warps per SM 310). Additionally, all of the shader bank binding tables 720 included in the parallel processing unit 202 may reference the same CBTBL 730. Thus, in this particular embodiment, the CBTBL 730 tracks the shader bank bindings for the entire parallel processing unit 202. A copy of the CBTBL 730 may be stored in the global cache controller (GCC) 334 included in each GPC 208. In other embodiments, a greater or lesser number of shader bank binding tables 720 and CBTBLs 730 may be used to bind SMs 310 to constant buffer resources.

The CBTBL 730 includes a limited number of buffer table entries 732 (e.g., 128 entries) that are used to reference data stored in the constant buffer 745. Consequently, the shader cache controller (SCC) 213 included in the parallel processing unit 202 may be configured to track the usage of each buffer table entry 732 in the CBTBL 730 and determine when a particular buffer table index 722 is no longer needed. In one embodiment, the SCC includes a SCC table that maintains a count of how many shader banks 726 are binding each buffer table index 722. Once the SCC determines that none of the shader banks 726 are binding a buffer table entry 732, the SCC may release the buffer table entry 732. This technique for tracking and releasing buffer table entries 732 is described below in further detail in conjunction with FIGS. 8A and 8B.

Figure 8A:
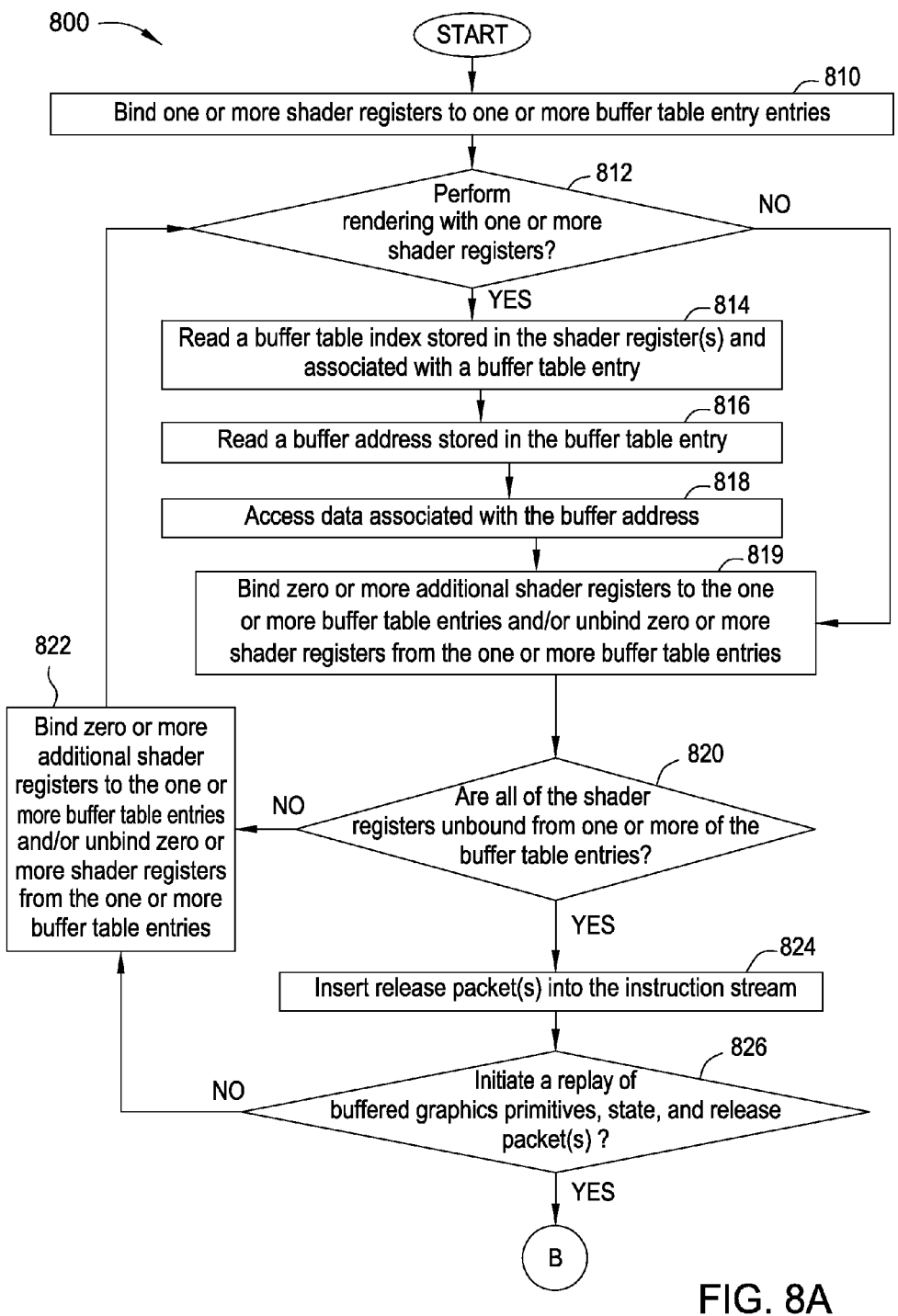
FIGS. 8A and 8B are a flow diagram of method steps for tracking the usage of a constant buffer table (CBTBL) entry of FIG. 7 and releasing the CBTBL entry during a replay of buffered primitives, according to one embodiment of the present invention.
Figure 8B:
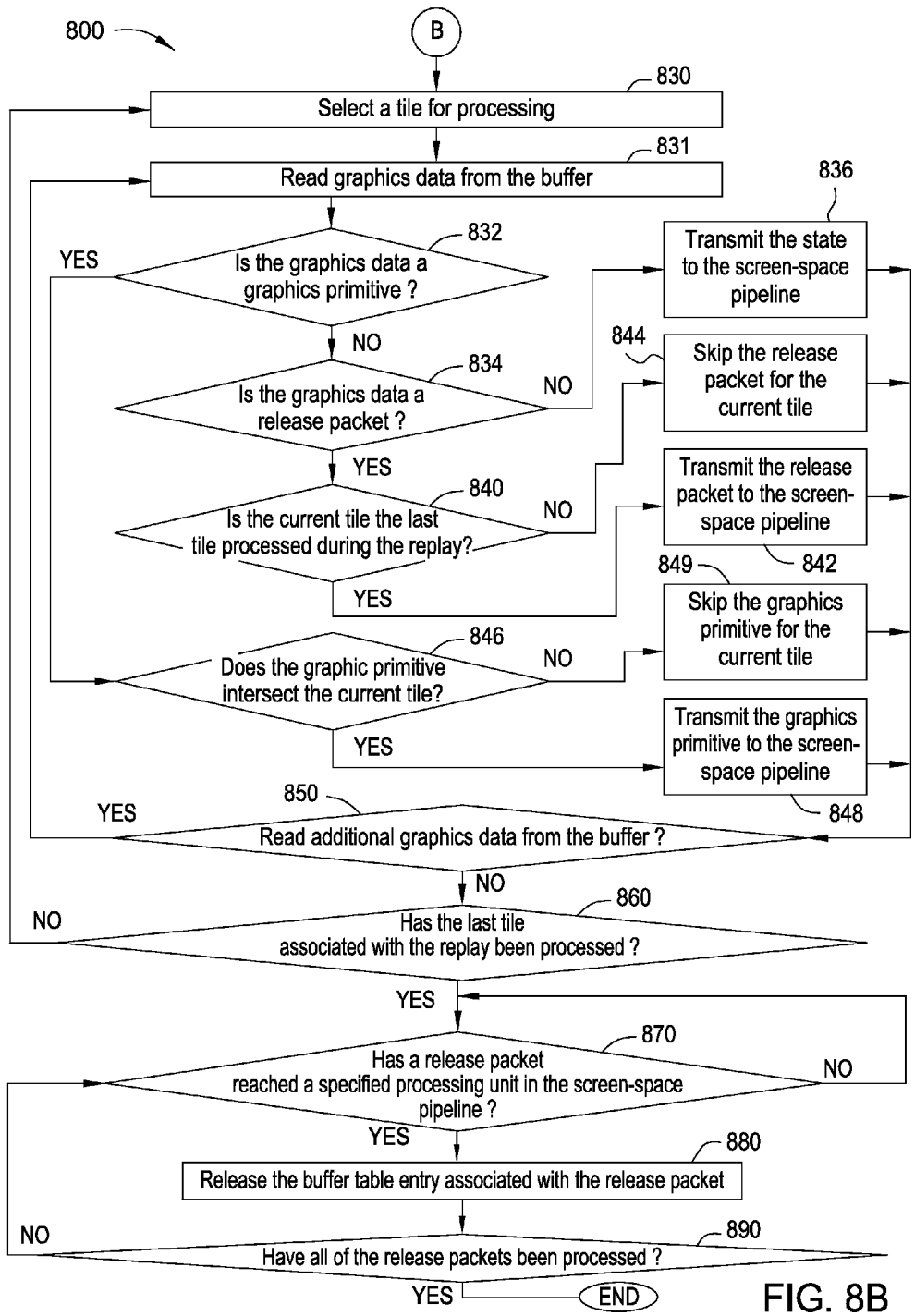

FIGS. 8A and 8B are a flow diagram of method steps for tracking the usage of a constant buffer table (CBTBL) entry 732 of FIG. 7 and releasing the CBTBL entry 732 during a replay of buffered primitives, according to one embodiment of the present invention. Although the method steps are described in conjunction with the systems of FIGS. 1-4 and 7, persons skilled in the art will understand that any system configured to perform the method steps, in any order, falls within the scope of the present invention. Additionally, although the method steps are described in conjunction with a CBTBL entry 732 of FIG. 7, the method steps also may be used to track and release other types of buffer table entries as well.

As shown, a method 800 begins at step 810, where a plurality of shader registers (e.g., shader banks 726) are bound to one or more buffer table entries 732 included in the CBTBL 730. The plurality of shader registers may be included in a single shader bank binding table 720, or the plurality of shader registers may be included in more than one shader bank binding table 720. At step 812, a SM 310 in the parallel processing unit 202 may perform rendering with a shader register. If rendering is performed, then the method 800 proceeds to step 814, where a buffer table index 722 (e.g., CBTBL index) associated with a buffer table entry 732 is read from the shader register by the SM 310. At step 816, the SM 310 reads a buffer address 734 stored in the buffer table entry 732. At step 818, the SM 310 then uses the buffer address 734 to access data from the constant buffer 745. Steps 814, 816, and 818 may be performed with multiple shader registers associated with one or more SMs 310, where each shader register stores a buffer table index 722 that points to the same buffer table entry 732 or to a different buffer table entry 732. At step 819, zero or more additional shader registers may be bound to the one or more of the buffer table entries 732 or unbound from the one or more buffer table entries 732.

Next, at step 820, the SCC 213 determines whether all shader registers have been unbound from one or more of the buffer table entries 732. In one embodiment, the SCC 213 determines whether all shader registers have been unbound from a buffer table entry 732 whenever the SCC 213 processes additional shader register bind and/or shader register unbind commands. This determination may be made by referencing a table stored in the SCC 213 to determine whether any of the shader registers currently store the buffer table index 722 associated with the buffer table entry 732. If the SCC 213 determines that not all of the shader registers have been unbound from the buffer table entry 732, then the method 800 proceeds to step 822, where the SMs 310 may bind zero or more additional shader registers to the one or more buffer table entries 732 and/or unbind zero or more additional shader registers from the one or more buffer table entries 732. The method 800 then returns to step 812, where the SMs 310 may perform additional rendering.

If, at step 812, no rendering is performed with the SMs 310, then the method 800 proceeds to step 819, where zero or more additional shader registers may be bound to the one or more of the buffer table entries 732 or unbound from the one or more buffer table entries 732. The method 800 then proceeds to step 820, where the SCC 213 again determines whether all shader registers have been unbound from a buffer table entry 732. If the SCC 213 determines that all of the shader registers are unbound from a buffer table entry 732, then the method 800 proceeds to step 824, where the SCC 213 transmits a release packet (e.g., a SCC feedback token) to the tiling unit 375.

Next, the tiling unit 375 receives the release packet from the SCC 213 and, at step 826, determines whether a replay of the buffered graphics, state, and release packet(s) should be initiated. If the tiling unit 375 does not initiate a replay, then the method 800 returns to step 822, where additional shader registers may be bound or unbound, and, at step 824, the SCC 213 may transmit additional release packets to the tiling unit 375. If the tiling unit 375 initiates a replay, then the method 800 proceeds to step 830, shown in FIG. 8B.

At step 830, the tiling unit 375 selects a cache tile 410 for processing. At step 831, the tiling unit 375 reads graphics data from the buffer. Next, at step 832, the tiling unit 375 determines whether the graphics data is a graphics primitive. If the graphics data is a graphics primitive, then, at step 846, the tiling unit 375 further determines whether the graphics primitive intersects the cache tile 410 that is currently being processed by the tiling unit 375. If the graphics primitive intersects the current cache tile 410, then, at step 848, the tiling unit 375 transmits the graphics primitive to the screen-space pipeline 354 for processing. The method 800 then proceeds to step 850. If the graphics primitive does not intersect the current cache tile 410, then, at step 849, the tiling unit 375 skips over the graphics primitive. The method 800 then proceeds to step 850.

If, at step 832, the tiling unit 375 determines that the graphics data is not a graphics primitive, then, at step 834, the tiling unit 375 determines whether the graphics data is a release packet. If the graphics data is not a release packet, then the tiling unit 375 determines that the graphics data is state and, at step 836, transmits the state to the screen-space pipeline 354. If the graphics data is a release packet, then the method 800 proceeds to step 840.

At step 840, the tiling unit 375 determines whether the current cache tile 410 being processed is the last cache tile 410 to be processed during the replay. If the current cache tile 410 is not the last cache tile 410 to be processed during the replay, then the tiling unit 375 determines that the release packet should not be transmitted to screen-space pipeline 354. Thus, at step 844, the tiling unit 375 skips over the release packet and the method 800 then proceeds to step 850.

At step 850, the tiling unit 375 determines whether additional graphics data is to be read from the buffer. If additional graphics data is to be read from the buffer, then the tiling unit 375 returns to step 831. If no additional graphics data is to be read from the buffer, then, at step 860, the tiling unit 375 determines whether the last cache tile 410 to be processed during the replay has been processed. If the last cache tile 410 has not been processed, then the method 800 returns to step 830, where an additional cache tile 410 is selected. If the last cache tile 410 has been processed, then the method 800 proceeds to step 870.

Next, at step 870, the front end unit 212 and/or tiling unit 375 determine whether any of the release packets have reached a specified processing unit within the graphics processing pipeline 350. Once a release packet reaches the specified processing unit, at step 880, the release packet and/or a separate acknowledgement is transmitted from the specified processing unit back to the SCC 213. The SCC 213 then receives the release packet and/or the acknowledgement and releases the buffer table entry 732 associated with the release packet. In one embodiment, the specified processing unit may be any unit in the graphics processing pipeline 350 after the last unit that is configured to read data associated with the buffer table entry 732. For example, the specified processing unit may be the ROP 395. In other embodiments, the SCC 213 may release the buffer table entry 732 once the release packet reaches a specified processing unit other than the ROP 395, such as the rasterizer 385, the pixel shading unit (PS) 390, or a different processing unit upstream or downstream of the ROP 395. As described above with respect to the method 500 of FIG. 5, the release packet may store a value that indicates which processing unit in the graphics processing pipeline 350 is the specified processing unit. A processing unit that receives the release packet may then read the value stored in the release packet to determine whether the processing unit should transmit the release packet and/or an acknowledgement to the sec 213.

Finally, at step 890, the front end unit 212 and/or tiling unit 375 determines whether all of the release packets have been processed. If not all of the release packets have been processed, then the method 800 returns to step 870. If all of the release packets have been processed, then the method 800 ends.

Although steps 870 and 880 are shown as being performed after step 860, steps 870 and 880 may be performed at any point after a release packet is transmitted to the tiling unit 375 at step 842. For example, the sec 213 may release one or more buffer table entries 732 associated with one or more release packets before the tiling unit 375 is finished reading graphics data from the buffer (e.g., step 831) for a particular cache tile 410.

In addition to the release packets described above in conjunction with FIGS. 8A and 8B, other types of release packets may be transmitted to the tiling unit 375 and replayed on the last cache tile 410 to release a graphics processing resource. For example, the SCC 213 may transmit a release packet to the tiling unit 375 to release a page pool entry (or a range of page pool entries) when the page pool entry is no longer needed. This release packet may have the same encoding or a different encoding than the release packets described above in conjunction with FIGS. 8A and 8B. In another example, other types of entries in different data structures may be tracked to determine when the entries are no longer needed. Such entries may then be released by transmitting a release packet to the tiling unit 375.

In sum, various techniques are disclosed for tracking and releasing resources used in a tile-based architecture. In a technique for releasing a graphics processing resource, a tiling unit receives and buffers a release packet. During a replay of buffered graphics primitives, the tiling unit reads the release packet and determines that the release packet is to be replayed on the last cache tile only. On the replay of the last cache tile, the release packet is transmitted to the screen-space pipeline by the tiling unit. Once the release packet reaches a specified processing unit in the screen-space pipeline, the release packet is transmitted back to the front end unit. The front end unit then causes the graphics processing resource to be released.

Further, in a technique for releasing a buffer entry, a tiling unit receives and buffers a plurality of graphics primitives and a buffer address of the buffer entry at which attributes associated with the graphics primitives are stored. During a replay of the buffered graphics primitives, for each cache tile intersected by the graphics primitives, the tiling unit transmits the graphics primitives and the buffer address to the setup unit in the screen-space pipeline and increments a counter. The tiling unit subsequently receives an acknowledgement from the screen-space pipeline for each cache tile—indicating that processing of the graphics primitives is complete with respect to the cache tile—and, in response, decrements the counter. Once the tiling unit determines that all acknowledgements have been received and processing of the last cache tile is complete, the tiling unit transmits a release packet to a buffer manager, causing the buffer manager to release the buffer entry.

Finally, in a technique for releasing a buffer table entry, a buffer controller (e.g., a shader cache controller (SCC)) tracks a number of shader registers that are bound to a particular buffer table entry. When the buffer controller determines that no shader registers are bound to the buffer table entry, the buffer controller inserts a release packet into the instruction stream. The tiling unit then receives and buffers the release packet. During replay of a last cache tile, the tiling unit transmits the release packet to the screen-space pipeline. Once the release packet reaches a specified processing unit at or near the end of the screen-space pipeline, the release packet is transmitted back to the shader cache controller. The shader cache controller then causes the buffer table entry to be released.

One advantage of the disclosed technique is that the use of a resource by the graphics processing pipeline may be tracked to determine when the resource is no longer needed. Once a resource is no longer needed, the resource may be released, increasing the availability of resources and, as a result, increasing processing efficiency in the graphics processing pipeline. In addition, tracking resource usage and determining when a particular resource is no longer needed before releasing the resource may reduce the incidence of errors in the graphics processing pipeline caused by premature release of resources.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for managing buffer entries in a tile-based architecture, the method comprising:
receiving a first plurality of graphics primitives and a first buffer address at which attributes associated with the first plurality of graphics primitives are stored;
for each tile included in a plurality of tiles:
determining that at least one graphics primitive included in the first plurality of graphics primitives intersects the tile;
transmitting the first plurality of graphics primitives and the first buffer address to a screen space pipeline for processing; and
receiving an acknowledgement from the screen space pipeline indicating that processing the first plurality of graphics primitives has completed;
determining that a first condition exists that indicates that processing the first plurality of graphics primitives has completed for a last tile included in the plurality of tiles;
determining that a second condition exists that indicates that the acknowledgement has been received for each tile included in the plurality of tiles; and
in response to determining that both the first condition and the second condition exists, releasing a buffer entry associated with the first buffer address.

2. The method of claim 1, wherein releasing the buffer entry associated with the first buffer address comprises transmitting a release packet associated with the buffer entry to a buffer manager.

3. The method of claim 2, wherein the release packet includes an address range associated with the buffer entry.

4. The method of claim 2, further comprising tracking, via a buffer table, a plurality of buffer entries, wherein each buffer entry included in the plurality of buffer entries is associated with a different buffer manager.

5. The method of claim 2, wherein the first plurality of graphics primitives and the first buffer address are received from a world space pipeline.

6. The method of claim 1, further comprising, for each tile included in the plurality of tiles, transmitting a first replay number to the screen space pipeline, wherein each acknowledgement received from the screen space pipeline includes the first replay number.

7. The method of claim 6, wherein determining that the second condition exists comprises determining that a first counter has reached an expected value, wherein, for each tile included in the plurality of tiles, the first counter is incremented in response to transmitting the first buffer address, and the first counter is decremented in response receiving the acknowledgement from the screen space pipeline.

8. The method of claim 7, wherein the first counter is associated with the first replay number, and a second counter is associated with a second replay number.

9. The method of claim 1, wherein determining that at least one graphics primitive included in the first plurality of graphics primitives intersects the tile is performed prior to transmitting the first plurality of graphics primitives and the first buffer address to the screen space pipeline.

10. A graphics processing pipeline configured to manage buffer entries in a tile-based architecture, the graphics processing pipeline comprising a tiling unit configured to:
receive a first plurality of graphics primitives and a first buffer address at which attributes associated with the first plurality of graphics primitives are stored;
for each tile included in a plurality of tiles:
determine that at least one graphics primitive included in the first plurality of graphics primitives intersects the tile;

transmit the first plurality of graphics primitives and the first buffer address to a screen space pipeline for processing; and receive an acknowledgement from the screen space pipeline indicating that processing the first plurality of graphics primitives has completed;

determine that a first condition exists that indicates that processing the first plurality of graphics primitives has completed for a last tile included in the plurality of tiles;

determine that a second condition exists that indicates that the acknowledgement has been received for each tile included in the plurality of tiles; and in response to determining that both the first condition and the second condition exists, cause a buffer entry associated with the first buffer address to be released.

11. The graphics processing pipeline of claim 10, wherein the tiling unit is configured to cause the buffer entry associated with the first buffer address to be released by transmitting a release packet associated with the buffer entry to a buffer manager.

12. The graphics processing pipeline of claim 11, wherein the release packet includes an address range associated with the buffer entry.

13. The graphics processing pipeline of claim 11, further comprising a plurality of buffer managers, wherein each buffer manager is configured to track, via a buffer table, at least one buffer entry.

14. The graphics processing pipeline of claim 11, wherein the first plurality of graphics primitives and the first buffer address are received by the tiling unit from a world space pipeline.

15. The graphics processing pipeline of claim 10, wherein the tiling unit is further configured to, for each tile included in the plurality of tiles, transmit a first replay number to the screen space pipeline, wherein each acknowledgement received from the screen space pipeline includes the first replay number.

16. The graphics processing pipeline of claim 15, wherein the tiling unit is configured to determine that the second condition exists by determining that a first counter has reached an expected value, wherein, for each tile included in the plurality of tiles, the first counter is incremented in response to transmitting the first buffer address, and the first counter is decremented in response receiving the acknowledgement from the screen space pipeline.

17. The graphics processing pipeline of claim 16, wherein the first counter is associated with the first replay number, and a second counter is associated with a second replay number.

18. The graphics processing pipeline of claim 10, wherein the tiling unit is configured to determine that at least one graphics primitive included in the first plurality of graphics primitives intersects the tile prior to transmitting the first plurality of graphics primitives and the first buffer address to the screen space pipeline.

19. A computing device, comprising:
a memory; and
a graphics processing pipeline that includes a tiling unit configured to:
  receive a first plurality of graphics primitives and a first buffer address at which attributes associated with the first plurality of graphics primitives are stored;
  for each tile included in a plurality of tiles:
    determine that at least one graphics primitive included in the first plurality of graphics primitives intersects the tile;
    transmit the first plurality of graphics primitives and the first buffer address to a screen space pipeline for processing; and
    receive an acknowledgement from the screen space pipeline indicating that processing the first plurality of graphics primitives has completed;
  determine that a first condition exists that indicates that processing the first plurality of graphics primitives has completed for a last tile included in the plurality of tiles;
  determine that a second condition exists that indicates that the acknowledgement has been received for each tile included in the plurality of tiles; and
  in response to determining that both the first condition and the second condition exists, cause a buffer entry associated with the first buffer address to be released.

20. The computing device of claim 19, wherein the tiling unit is configured to cause the buffer entry associated with the first buffer address to be released by transmitting a release packet associated with the buffer entry to a buffer manager.

* * * * *